UNITED STATES PATENT OFFICE.

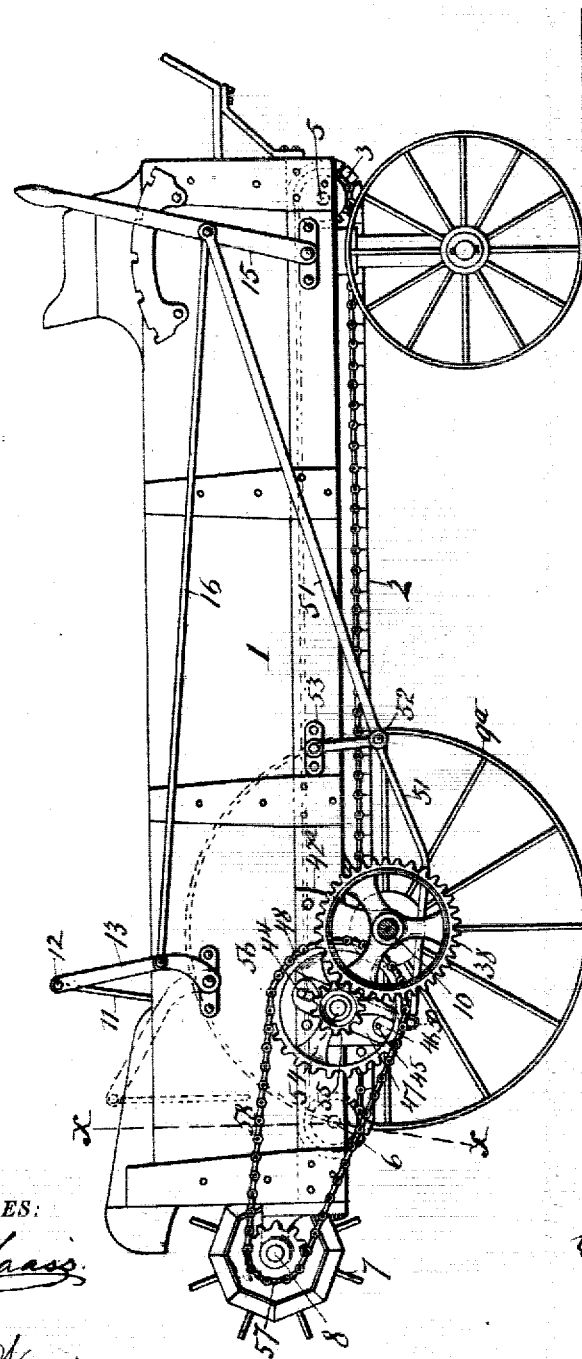

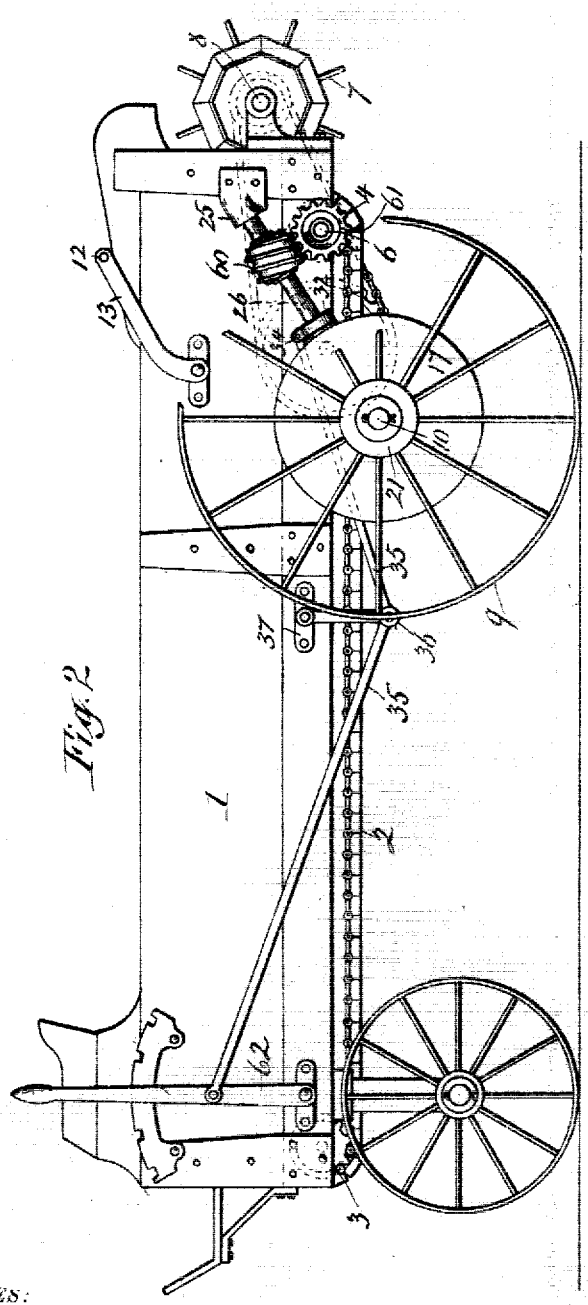

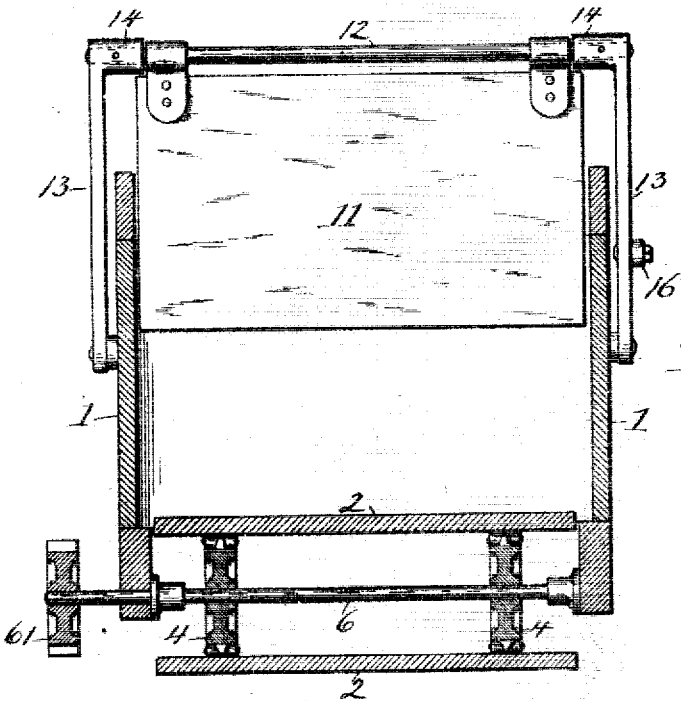
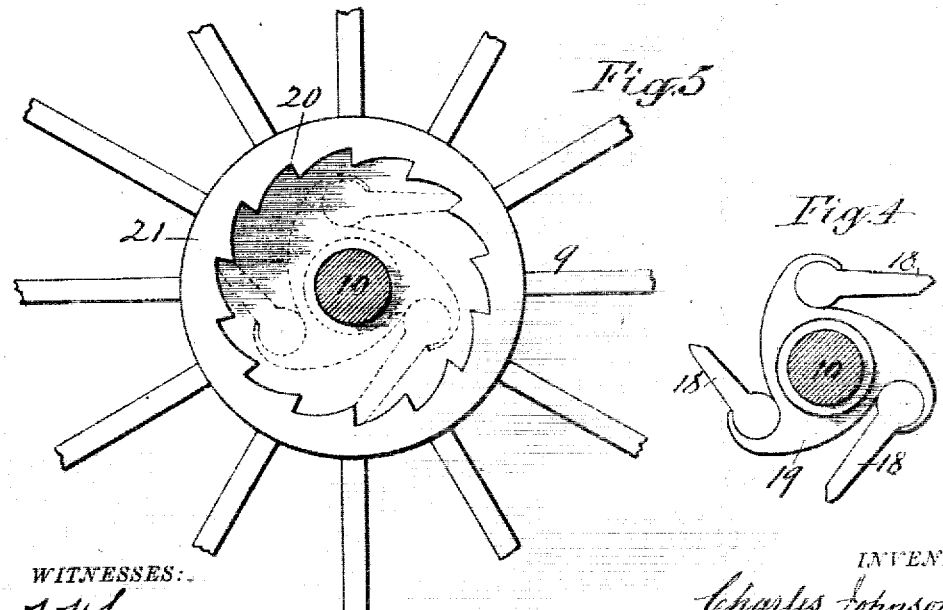

CHARLES JOHNSON, OF AUBURN, NEW YORK.

MANURE-SPREADER.

No. 853,587. Specification of Letters Patent. Patented May 14, 1907.

Application filed August 6, 1906. Serial No. 329,328.

*To all whom it may concern:*

Be it known that I, CHARLES JOHNSON, a citizen of the United States, and a resident of Auburn, in the county of Cayuga, in the State of New York, have invented new and useful Improvements in Manure-Spreaders, of which the following, taken in connection with the accompanying drawings, is a full, clear, and exact description.

This invention relates chiefly to mechanisms for transmitting motion to the rotary beater which scatters the manure or fertilizing material in its delivery from the machine.

The object of the invention is to provide simple and efficient mechanisms for producing the aforesaid transmissions of motions. And to that end the invention consists in the novel construction and combination of the component parts of the mechanisms hereinafter described and claimed.

Figure 6:
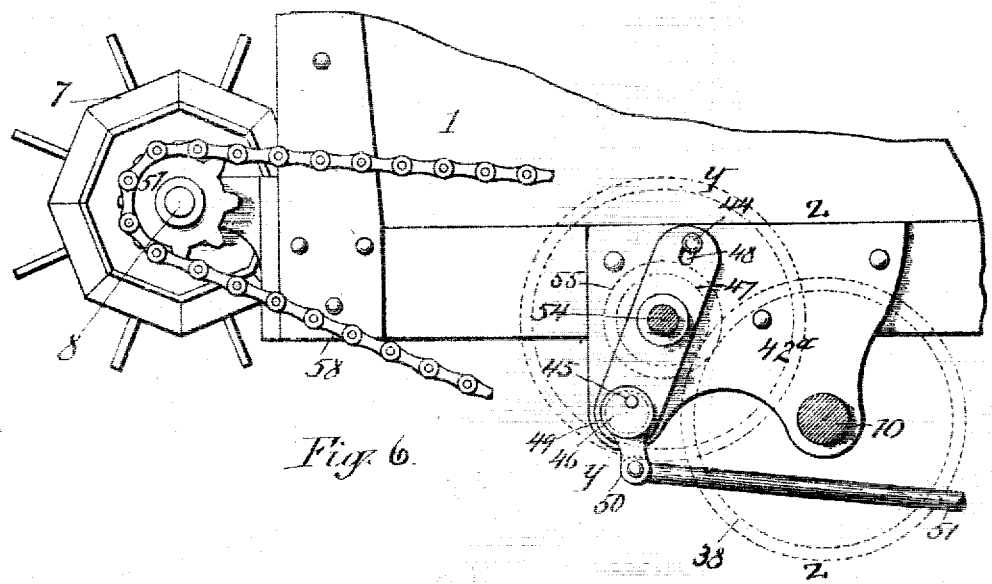
Figures 7, 8:
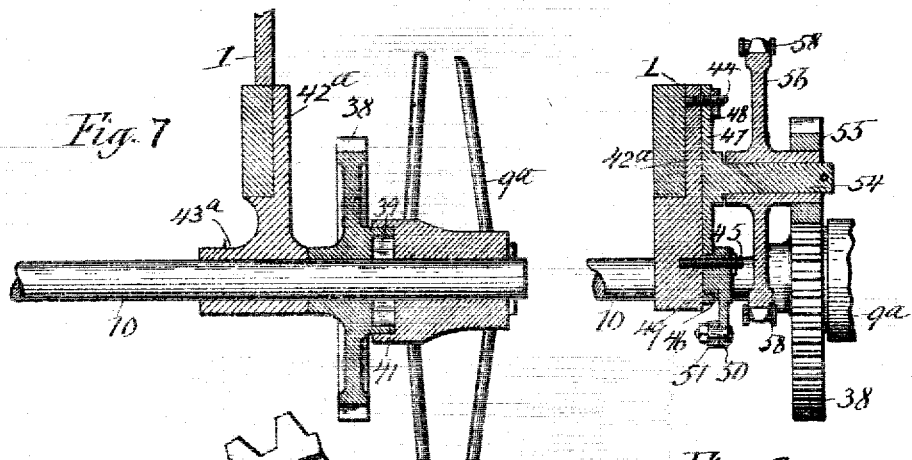
Figure 9:
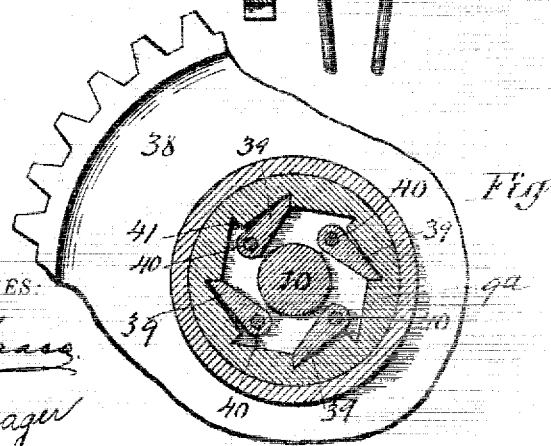

In the accompanying drawings Figure 1 is a side elevation of a manure-spreading machine embodying my invention, showing the end-board in its raised position; Fig. 2 is an elevation of the opposite side of the machine showing the end-board in its lowered position—Fig. 3 is a transverse section on the line; x—x—in Fig. 1. Figs. 4 and 5 are face views of the pawl and ratchet, which transmit motion from the traction-wheel to the mechanisms which impart motion to the apron-shaft; Fig. 6 is an enlarged fragmentary side view of part of the devices for throwing the beater-driving mechanism in and out of gear; Fig. 7 is a transverse section on the line —z— z— in Fig. 6; Fig. 8 is a transverse section on the line —y—y— in Fig. 6; and Fig. 9 is a face view of the pawl and ratchet which transmit motion from the traction-wheel to the beater-actuating mechanism.

—1— denotes the body or box of the vehicle in which the manure is transported to the field upon which the manure is to be distributed. The bottom of said body consists of a longitudinally movable apron —2— composed of transverse slats attached to endless chains which are carried on sprocket-wheels —3— —4— mounted on transverse shafts —5—6— near the front and rear ends of the body —1—. The wheels —4— are fastened to the rear shaft —6— journaled in suitable bearings attached to the body. Said rear shaft receives rotary motion by means of suitable mechanism, which does not pertain to my present invention and is only partly shown in Figs. 2, 4 and 5 of the drawings, in which 17 denotes a disk-gear which is mounted loosely on the axle —10— of the traction-wheel —9— and receives motion by means of a suitable clutch or by pawls —18— pivoted on a spider —19— fastened to the disk-gear —17— and engaging a ratchet —20— in the hub —21— of the traction-wheel, (see Figs. 4 and 5). A shaft —26— shown in Fig. 2 receives rotary motion from the disk-gear —17— and has rigidly attached to it a worm —60— which engages a worm-gear —61— attached to the apron-shaft —6—. The apron —2— thus receives longitudinal movement. —32— represents a collar connected to suitable speed-changing devices mounted on the shaft —26— and provided with ears —34—, to which is connected the rear end of a rod —35—, the front end of which is connected to a lever —62— by means of which the speed-changing devices are controlled. The rod —35— is composed of two end-sections which are connected at their junction to a hanger —36— pivoted to a plate —37— attached to the body —1—. The front wheels —3— are rotated by the movement of the apron.

—7— represents the usual beater, which extends across the rear end of the machine and has its shaft —8— journaled in suitable bearings secured to the sides of the body —1—.

—9—9ª— are the traction-wheels which are journaled on the hind axle —10—.

—11— represents the end-board which is movable vertically and placed across the interior of the body —1— at a short distance from the front of the beater during the time of loading the manure in the body —1— and conveying it to the field, thus preventing the manure from clogging the beater. The end-board being subsequently raised to allow the manure to pass to the beater which scatters the manure upon the field traversed by the machine. Said end-board is attached at its top to a shaft —12— by which it is suspended from arms —13— pivoted to the exterior of the sides of the body —1—. Said arms are formed with inwardly projecting tubular bearings —14— into which the ends of the shaft —12— are inserted. These bearings come in contact with the top of the body when the end-board is lowered into the body and thus limit the descent of the end-board. To the front end of the body is pivoted a hand-lever —15— which is connected with one of the arms —13— by a rod —16—. Said hand-lever and its connections allows the attendant of the machine to lift the endboard when the machine is set into operation.

The beater —7— receives rotary motion from mechanisms actuated by the traction-wheel —9ª— adjacent to the inner side of which is a gear-wheel —38— mounted loosely on the axle —10— and rotated in one direction by pawls —39— pivoted on pins —40— projecting from the side of the gear-wheel —38—, which pawls engage a ratchet —41— in the hub of the traction-wheel as shown in Fig. 9.

To the side of the body —1— is firmly attached a bracket —42ª— the bottom of which is formed with a sleeve —43ª— receiving through it the axle —10— and serving as one of the supports for the body —1— as shown in Figs. 7 and 8. The outer side of the bracket —42ª— has projecting from it two pins or studs —44— and —45— arranged one above the other. On the lower stud —45— is pivoted an eccentric —46— and on the face of the bracket lies a plate —47— the upper end of which is provided with a slot —48— which receives the upper stud —44—. The lower end of said plate is formed with a circular aperture —49— receiving the eccentric —46— which is provided with a radial arm —50—; to the end of which is connected the rear end of a manually operated rod —51—. This rod is composed of two end sections connected at their junction to an arm —52— pivoted to a plate —53— attached to the body. The front section of the rod —51— is extended and connected to the hand-lever —15— hereinbefore mentioned to allow said hand-lever to control simultaneously the end-board —11— and the actuating mechanism of the beater. The rear end-section of the rod —51— passes under the axle —10— and is connected to the arm —50— of the eccentric 46.

The central portion of the plate —47— is provided with an outwardly projecting stub-shaft —54— on which is journaled a pinion —55— adapted to engage the gear-wheel —38—. To the hub of the said pinion is fastened a sprocket-wheel —56— which is connected by a sprocket chain —58— with a sprocket-wheel —57— attached to the beater-shaft —8—.

The beater is set in motion and the end-board —11— is simultaneously lifted by the operator throwing the hand-lever —15— in a direction which causes the rod —51— to turn the eccentric —46— so as to push the plate —47— toward the gear-wheel —38— and cause the pinion —55— to engage said wheel and receive rotary motion therefrom. The sprocket-wheel —56— rotating with the pinion imparts rotary motion to the sprocket-wheel —57— on the beater-shaft. When it is desired to arrest the motion of the beater, the operator throws the hand-lever —15— in a direction reverse from that before mentioned and thereby causes the rod —51— to turn the eccentric —46— so as to push the plate —47— from the gear-wheel —38— and thus throw the pinion out of engagement with the gear-wheel. Said pinion being thereby deprived of motion renders the beater stationary. At the same time the end-board —11— is lowered by the rod —16— connecting the lever —15— to one of the arms —13— which carry the said end-board.

What I claim as my invention is:—

1. A beater-actuating mechanism comprising a gear-wheel receiving motion from the traction-wheel, an elongated plate pivotally supported at one end and shiftable longitudinally on its support, a pinion pivoted on said plate, means for swinging and shifting the plate to carry the pinion to and from engagement with the aforesaid gear-wheel, and means for transmitting motion from the pinion to the beater as set forth.

2. A beater-actuating mechanism comprising a gear-wheel receiving motion from the traction-wheel, an elongated plate pivotally supported at one end and shiftable longitudinally on its support, a pinion pivoted on said plate, an eccentric imparting a swinging and longitudinal movement to the plate to carry the pinion to and from engagement with the aforesaid gear-wheel, and means for transmitting motion from the pinion to the beater as set forth.

3. The combination, with the body, of arms pivoted at one end to the sides of said body and formed at their free ends with inwardly projecting bearings disposed to contact with the top of the body and thereby limit the descent of the arms, the end-board suspended from said arms, a hand-lever pivoted to the body and a rod connecting said hand-lever to the central portion of one of the aforesaid arms.

4. A beater-actuating mechansim comprising a gear-wheel receiving motion from the traction-wheel, a stationary bracket, an elongated plate pivoted at one end on said bracket and movable longitudinally on its pivot, an eccentric pivoted to the bracket and imparting lateral and longitudinal movement to the plate, a pinion pivoted to the plate and carried thereby to and from engagement with the aforesaid gear-wheel, an arm extending from the eccentric, a rod connected to said arm, and a hand-lever connected to said rod as set forth.

CHARLES JOHNSON.

Witnesses:
J. J. LAASS,
B. M. WAGER.